March 27, 1951 H. K. HALVORSEN ET AL 2,546,445
SIDE BLOCK
Filed Aug. 27, 1949

HENRY K. HALVORSEN
HENRY K. HALVORSEN, JR
INVENTORS

BY James D. Givnan
ATT'Y

Patented Mar. 27, 1951

2,546,445

UNITED STATES PATENT OFFICE 2,546,445

SIDE BLOCK

Henry K. Halvorsen and Henry K. Halvorsen, Jr., Sutherlin, Oreg.

Application August 27, 1949, Serial No. 112,705

1 Claim. (Cl. 254—193)

This invention relates to improvements in side blocks particularly adapted for use in logging operations.

It is one of the principal objects of the invention to provide a side block with sister hooks and to render the combination readily adaptable for use with a wide range of sizes of wire rope, cable and the like.

A further object is to provide a side block of this character which is of simple, efficient and durable construction and one which will save an operator's time in applying the pulley to a line and in attaching the sister hooks to a choker eye or other permanent fixture.

These and other objects will appear as our invention is more fully hereinafter described in the following specification, illustrated in the accompanying drawing and finally pointed out in the appended claim.

Figure 1:
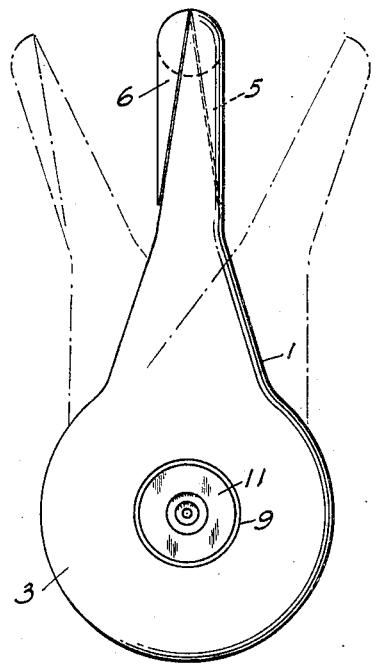
Figure 1 is a side elevation of a side block made in accordance with our invention.
Figure 2:
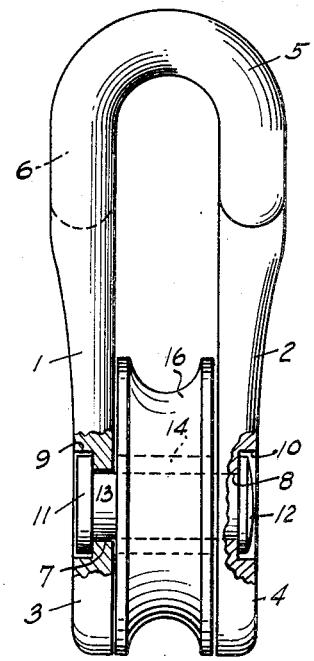
Figure 2 is a front elevation of Figure 1.
Figure 4:
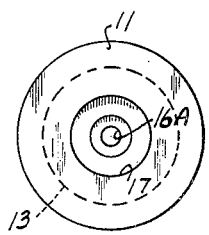
Figure 4 is an end elevation of Figure 3.
Figure 3:
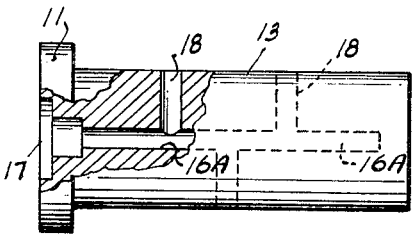
Figure 3 is an enlarged side elevation of a bearing pin with a fragment broken away for convenience of illustration.
Figure 5:
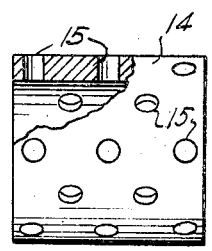
Figure 5 is a side elevation of a bearing with a fragment broken away.

Referring now more particularly to the drawing:

In Figures 1 and 2, reference numerals 1 and 2 indicate a pair of identical sister hooks enlarged into flanges 3 and 4, respectively, at their lower ends and reduced in thickness and turned back on themselves as at 5 and 6, respectively, at their opposite ends for overlapping engagement with each other, as shown.

Through each flange we form aligned openings 7 and 8 which are counterbored as at 9 and 10, respectively, to receive the head 11 and the riveted end 12 of a bearing pin 13 which extends through the openings 7 and 8. Surrounding the pin 13 is a bearing 14, provided with lubricant-retaining and distributing openings 15, and secured by a forced fit to a sheave 16.

By means of the riveted head 12 the pin 13 is secured at that end to the flanged portion 4 of the sister hook 2 while the companion sister hook 1 is free to rotate about the pin 13 for opening and closing the hooks with respect to each other.

For supplying a lubricant to the bearing 14 and pin 13, the pin is formed with a longitudinal bore 16A open at one of its ends as at 17 and in open communication with radiating ducts 18 for distributing the lubricant to the retaining openings 15 in the bearing 14.

While we have shown a particular form of embodiment of our invention, we are aware that many minor changes therein will readily suggest themselves to others skilled in the art without departing from the spirit and scope of the invention. Having thus described our invention, what we claim as new and desire to protect by Letters Patent is:

A side block comprising in combination a pair of spaced apart cheek plates of substantially circular formation, a hook shank formed integral with each of said cheek plates extending outwardly therefrom and turned back on itself to form one-half of a shackle, said turned back portion of each of said shanks being substantially semi-circular in cross-section to form a complete circle in cross-section when said halves are brought together, each of said cheek plates having aligned openings therein to form a bearing, a counterbore surrounding each of said openings, a bearing pin extending through said aligned openings and formed with a head at each of its ends disposed within said counterbores, one of said heads being attached to one of said cheek plates, a bearing sleeve mounted upon and surrounding said bearing pin, a sheave rotatably mounted upon said bearing sleeve and occupying the space between said cheek plates and of a diameter equal to the diameter of said cheek plates, said bearing pin having a central bore extending substantially throughout its length and a plurality of radiating ducts extending from said bore to distribute a lubricant to the interior of said bearing sleeve, and said bearing sleeve having a plurality of lubricant retaining openings formed therein for supplying lubricant to said sheave.

HENRY K. HALVORSEN.
HENRY K. HALVORSEN, Jr.

REFERENCES CITED

The following references are of record in the file of this patent:

UNITED STATES PATENTS

| Number | Name | Date |
|---|---|---|
| 1,070,834 | Nissen | Aug. 19, 1913 |
| 1,424,075 | Boyken | July 25, 1922 |
| 1,731,587 | Morgan | Oct. 15, 1929 |
| 1,819,334 | North | Aug. 18, 1931 |
| 2,147,183 | Zimbalist | Feb. 14, 1939 |